US012776589B2

(12) United States Patent
Deuchst et al.

(10) Patent No.: US 12,776,589 B2
(45) Date of Patent: Oct. 27, 2026

(54) DIRECT RADIATING ARRAY ANTENNA ASSEMBLY

(71) Applicant: MacDonald, Dettwiler and Associates Corporation, Sainte-Anne-de-Bellevue (CA)

(72) Inventors: Guillaume Deuchst, Sainte-Anne-de-Bellevue (CA); Emily Mackay Suthertown, Ottawa (CA); Stephen Wilson, Pointe Claire (CA); Billy Marquez, Laval (CA)

(73) Assignee: MacDonald, Dettwiler and Associates Corporation, Sainte-Anne-de-Bellevue (CA)

( * ) Notice: Subject to any disclaimer, the term of this patent is extended or adjusted under 35 U.S.C. 154(b) by 116 days.

(21) Appl. No.: 18/837,792

(22) PCT Filed: Feb. 17, 2023

(86) PCT No.: PCT/CA2023/050213
§ 371 (c)(1),
(2) Date: Aug. 12, 2024

(87) PCT Pub. No.: WO2023/155018
PCT Pub. Date: Aug. 24, 2023

(65) Prior Publication Data

US 2025/0141118 A1 May 1, 2025

Related U.S. Application Data

(60) Provisional application No. 63/311,786, filed on Feb. 18, 2022.

(51) Int. Cl.
*H01Q 21/06* (2006.01)
*H01Q 1/02* (2006.01)
(Continued)

(52) U.S. Cl.
CPC ............. *H01Q 21/065* (2013.01); *H01Q 1/02* (2013.01); *H01Q 1/288* (2013.01); *H01Q 1/526* (2013.01); *H01Q 3/34* (2013.01)

(58) Field of Classification Search
CPC .......... H01Q 1/02; H01Q 1/288; H01Q 1/526; H01Q 3/34; H01Q 21/065
See application file for complete search history.

(56) References Cited

U.S. PATENT DOCUMENTS 8,120,537 B2 2/2012 Del Rio et al.
8,654,017 B1 * 2/2014 Voss .................... H01Q 21/065 343/705
(Continued)

FOREIGN PATENT DOCUMENTS

EP 3 133 694 A2 2/2017
WO 2021/062540 A1 8/2021
(Continued)

OTHER PUBLICATIONS

International Search Report and Written Opinion issued on PCT International Patent Application No. PCT/CA2023/050213, issued on May 4, 2023.
(Continued)

*Primary Examiner* — Daniel Munoz
(74) *Attorney, Agent, or Firm* — Own Innovation; Kent C. Howe; James W. Hinton

(57) ABSTRACT

Provided is a direct radiating array ("DRA") antenna, the antenna including a printed circuit board ("PCB") having a first side and a second side opposing the first side, a thermal interface plate arranged generally parallel to the PCB, a plurality of radiating elements mounted to the first side of the PCB, a plurality of radio frequency ("RF") chains mounted to the second side of the PCB and to the thermal interface plate, each respective one of the plurality of RF chains coupled to and located proximate to a respective one
(Continued)

of the plurality of patch radiating elements and thermally coupled to the thermal interface plate and a plurality of beamforming circuits mounted to the second side of the PCB, wherein each of the RF chains is connected to at least one of the plurality of beamforming circuits.

17 Claims, 14 Drawing Sheets

(51) Int. Cl.

*H01Q 1/28* (2006.01)
*H01Q 1/52* (2006.01)
*H01Q 3/34* (2006.01)

(56) References Cited

U.S. PATENT DOCUMENTS 9,609,530 B2 3/2017 Lea et al.
9,711,853 B2 7/2017 Foo
10,535,919 B2 1/2020 Linn et al.
2015/0015453 A1 1/2015 Puzella et al.
2020/0091608 A1* 3/2020 Alpman ............... H01Q 9/0414
2022/0352636 A1* 11/2022 Yetisir .................... H04B 17/11

FOREIGN PATENT DOCUMENTS

WO 2021/252036 A1 12/2021
WO 2022/120461 A1 6/2022

OTHER PUBLICATIONS

Kuznetcov, Maksim V., et al. "Planar Feeding Circuit Integrated With a Compact Dielectric Resonator for Polarization Diversity." IEEE Transactions on Microwave Theory and Techniques 69.4 (2021): 2229-2240.

EPO, Extended European Search Report for European Patent Application No. 23755614.7 dated Dec. 15, 2025.

Kuznetcov, Maksim V. et al.: "Planar Feeding Circuit Integrated With a Compact Dielectric Resonator for Polarization Diversity.", IEEE Transactions on Microwave Theory and Techniques, vol. 69, No. 4 2021, pp. 2229-2240, XP011846644, DOI: 10.1109/TMTT.2021.3053980 (URL: https://www.pure.ed.ac.uk/ws/portalfiles/portal/201431629/09381615.pdf).

* cited by examiner

DIRECT RADIATING ARRAY ANTENNA ASSEMBLY

TECHNICAL FIELD

The following relates generally to antennas and antenna assemblies for radio frequency (RF) communication, and more particularly to direct radiating array antennas.

Introduction

As the number of connected devices and the need for communication between them continues to increase, along with the generation and proliferation of data generated by such devices, so too does demand for communications systems for facilitating such communication. One such manner of facilitating communication is with communications satellites. The market for communications satellites is set to explode as it becomes easier to launch satellites into space and the demand for satellite-based communication increases.

Communications satellites facilitate communications through onboard antennas. One such example of an antenna is an active direct radiating array antenna. It is important for such antennas to manage and balance size, mass, and power. It is often desired to have an antenna that may provide any one or more of reduced size, reduced mass, or reduced power consumption, or that may provide performance trade-offs while effectively managing the size, mass, and power of the antenna. For example, in spaceborne applications, the allocated overall weight for an antenna may be constrained, thereby limiting the number of radiating elements and the performance of the antenna.

Continuously increasing frequency bands of the signal for communication and the quantity of beams carrying the signals may make it more and more difficult to have a significant number of mechanical and electrical components concentrated in a location in proximity to the array while maintaining antenna efficiency especially for Low Earth Orbit applications. LEO makes the DRA scan requirement larger, which then makes the elements spacing narrower (i.e. spacing between radiating elements). LEO is therefore much more challenging than GEO or MEO in terms of mechanical and electrical components concentrated in close proximity. To reduce signal losses through different components, such components may need to be positioned as close as possible to the aperture of the array to limit signal path length as much as possible.

There is also a need to effectively manage heat generated by components of the antenna, such as signal amplifiers and other electrical, electronic, and electromechanical components, to avoid temperature increases that may reduce overall antenna performance. Structures for dissipating the heat generated by antenna components may thus be desired. Such structures can, however, complicate the overall integration of the antenna. As a result, the weight of antennas such as direct radiating arrays can be significant, which may in turn negatively impact the satellite mission.

Structural requirements of the antenna (e.g. interface plates, mechanical supports, radiating elements, signal amplification paths, and structures for dissipating heat, etc.) can be significant and can require a significant physical volume, which may increase the weight of the antenna and reduce available space on a spacecraft. In spaceborne applications, the allocated overall weight and available space for an antenna may be limited, which can limit the number of radiating elements and reduce the performance of the antenna.

Satellites may employ optical communication links which require line of sight access for proper operation. Some current DRA antenna assembly units may comprise a relatively high profile, which may infringe on the field of view of optical heads communication link, reducing the effectiveness of the optical communication link.

Additionally, when deployed in an outer space environment the antenna may be subject to a wide array of wave and particle radiation, which may interfere with the operation of the antenna. Radiation shielding of certain sensitive components may be required to ensure proper performance of the antenna. Such radiation shielding may increase the weight of the antenna and further decrease the available space on the spacecraft.

Accordingly, there is a need for an improved direct radiating array antenna and method of assembly that overcomes at least some of the disadvantages of existing direct radiating array systems and methods.

SUMMARY

According to an embodiment, described herein is a direct radiating array ("DRA") antenna. The antenna comprises a printed circuit board ("PCB") having a first side and a second side opposing the first side, a thermal interface plate arranged generally parallel to the PCB, a plurality of radiating elements mounted to the first side of the PCB, a plurality of radio frequency ("RF") chains mounted to the second side of the PCB and to the thermal interface plate, each respective one of the plurality of RF chains coupled to and located proximate to a respective one of the plurality of patch radiating elements and thermally coupled to the thermal interface plate, and a plurality of beamforming circuits mounted to the second side of the PCB, wherein each of the RF chains is connected to at least one of the plurality of beamforming circuits.

According to some embodiments, the RF chains are arranged in a plurality of stacks, each respective one of the plurality of stacks mounted to the second side of the PCB and extending generally perpendicular to the second side of the PCB.

According to some embodiments, the radiating elements are patch radiating elements.

According to some embodiments, the PCB includes one or more copper radiation shielding layers embedded in the PCB and positioned to shield electrical, electronic, or electromechanical components of the DRA antenna from radiation.

According to some embodiments, wherein the thermal interface plate includes a plurality of fluidic channels.

According to some embodiments, wherein the thermal interface plate acts as the only thermal spreader and conductive and radiative exchange interface of the DRA antenna with a mobile or stationary structure when mounted on the mobile or stationary structure.

According to some embodiments, the mobile or stationary structure is a spacecraft.

According to some embodiments, the mobile or stationary structure is a low earth orbit satellite.

According to some embodiments, each of the plurality of stacks is connected to the thermal interface via one or more thermal interface materials.

According to another embodiment, described herein is a DRA antenna, comprising a printed circuit board having a first side and a second side opposing the first side, a plurality of radiating elements mounted to the first side of the PCB, and a plurality of RF chains each coupled to a respective one of the plurality of radiating elements, the plurality of RF chains arranged in a plurality of stacks with each respective one of the plurality of stacks mounted to the second side of the PCB and extending generally perpendicular to the second side of the PCB.

According to some embodiments, radiating elements comprise patch radiating elements.

According to some embodiments, the beamforming circuits are configured to perform digital beamforming.

According to some embodiments, the beamforming circuits are configured to perform analog beamforming.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
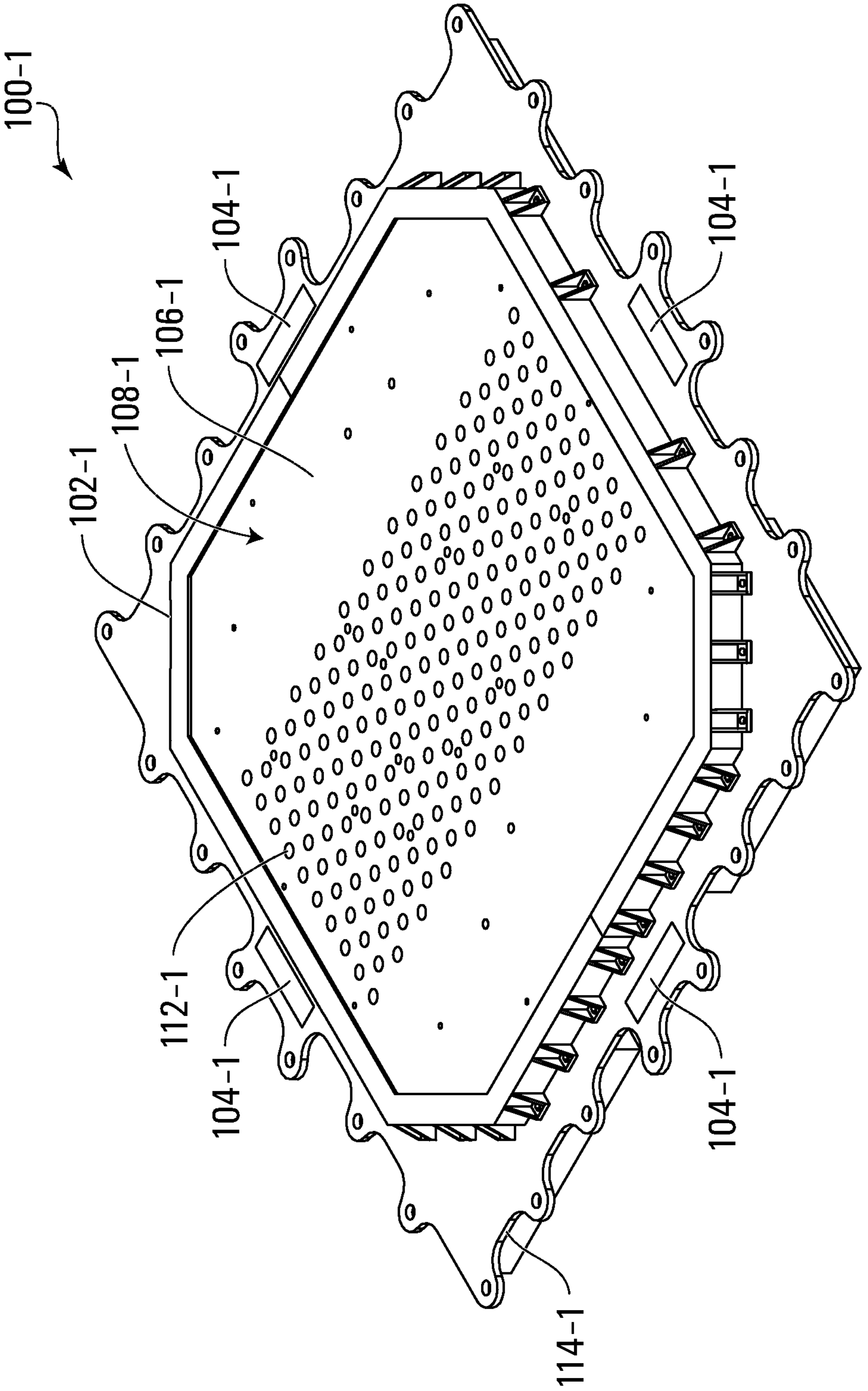
FIG. 1 is a perspective view of a transmit configured direct radiating array (DRA) antenna assembly, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The following relates generally to antenna-based communication systems, and more particularly to direct radiating array ("DRA") antennas. While the DRA antenna assemblies of the present disclosure are described in the context of a space-based application (e.g. on a satellite or other spacecraft), it is to be understood that the DRA antenna assemblies can be used in non-space applications (such as on a ground terminal) and such uses are contemplated by this disclosure. In variations, the DRA antenna of the present disclosure may be configured for digital beamforming or analog beamforming.

The DRA of the present disclosure may be more compact or low profile than existing DRAs. A low-profile configuration may result in an improved field of view for surrounding equipment (e.g. as compared to a taller DRA), as the DRA may be out of the line of sight of other equipment, such as optical intersatellite links. This may advantageously reduce size, cost, and/or mass, which can be a significant factor in implementing the DRA in space-based applications. Compact packaging of amplifiers, filters, polarizers, and other electrical components under radiating elements (e.g. on the opposite side (side 1) of PCB versus radiating elements) places dissipative/heat producing components on (side 2) of PCB for heat removal. This PCB configuration also eases PCB assembly, as components are attached to only one side of PCB, resulting in fewer setup and inspection operations, and reducing assembly time. Thermal interface materials create challenges for re-workability. For example, single use adhesives may preferable be used in some examples, which may not be easily removed. In other examples, gaskets may be used, which may damage electrical components by compression. As only a single thermal interface is present, fewer thermal interface materials may need to be placed within DRA. Such a configuration may allow for thermal components of the DRA to be assembled at a single assembly station.

The DRA of the present disclosure may employ three-dimensional stacked packaging of electrical components on, or attached to, the PCB. This stacked packaging resolves PCB real estate issues and to some degree radiation problems, as some components may be shielded by the components below in the three-dimensional component stack. Additionally, highly integrated monolithic microwave integrated circuits, substrates, and other electronic components, along with printed RF assemblies, connectorized interfaces, direct waveguide interfaces, wire bonded interfaces, pin/socket interfaces, ball grid array/land grid array interfaces, surface mount technology interfaces, micromachined radio frequency components, conventional SIPs, bare die, monolithic microwave integrated circuit, ceramic or alumina filters, 3D printed filters may be applied in the DRA of the present disclosure. This mix of technologies can be used to provide multiple physical levels of interconnectivity while placing the dissipative/heat producing components at the top of the three-dimensional stack for removal of heat directly to a thermal sink. Dissipative components may include DC power components such as voltage regulators, beamforming integrated circuits, and RF amplification components such as drivers, pre-drivers and high-power amplifiers. Additionally, this three-dimensional stacked packaging provides additional design freedom to control the coefficient of thermal expansion stack up, such that DRA thermal fatigue life may be optimized.

The DRA of the present disclosure is configured such that all the active RF electronic components are placed on one side of the one PCB. Because of this placement, these components can all be thermally coupled to a single cold plate thus realizing a high thermal efficiency. The cold plate can be positioned in direct contact with spacecraft thermal control hardware (which may, for example, include heat pipes embedded in a spacecraft panel or on a spacecraft panel) which allows for a smaller DRA package and reduces the difficulty of thermal management at the DRA level. Such an arrangement avoids duplication of thermal hardware between the DRA and the spacecraft and thus reduces the overall mass and cost at spacecraft level. Mounting the DRA directly on a spacecraft panel can minimize the height of the installed assembly, reducing the chance of blocking any surrounding RF or optical equipment.

The cold plate of the DRA may be constructed from a highly conductive material and configured such that fluidic channels run through the thermal plane/cold plate. In an embodiment, all heat sources of the DRA are connected to the cold plate via thermal interface materials. The single plane cold plate (single plane thermal interface) reduces the number of thermal interfaces and increases overall thermal efficiency of the assembly by collecting heat from the DRA and transporting it directly to a spacecraft heat sink while maintaining a small temperature gradient between source and sink. The single plane configuration may also ensure no dissipative component is mechanically far from a heatsink. The thermal design of the DRA of the present disclosure may be mostly conductive and be configured to gather and transport heat between different sources with lowest possible temperature gradients along the way. The thermal interface plate may act as a main thermal highway to which main dissipative components of the DRA are connected and may be configured to transfer heat dissipated in the DRA to a spacecraft thermal interface (e.g. heat pipes) located centrally under and/or at the perimeter of the DRA. By configuring the DRA such that the spacecraft thermal interface or heat pipes are at the center of the DRA, or underneath the area of the DRA rather than on two sides, thermal path lengths may be optimized. The routing of the spacecraft heat pipes described herein may eliminate the need to transport heat laterally and rather dump the heat directly into the thermal subsystem of the spacecraft. Additionally, supplemental hardware may be placed on the side of the PCB including radiating elements.

In some embodiments, the PCB of the DRA of the present disclosure is configured to include one or more dedicated copper planes in the PCB as radiation shielding for radiation sensitive electrical components of the DRA. The flat configuration of the DRA of the present disclosure may cause electrical components (electrical, electronic, and electromechanical components) of the DRA to be more exposed to radiation, having less metallic hardware between external radiation sources and electrical components. In addition to the one or more copper plane radiation shields, copper planes may also be present in the PCB layer for grounding, thermal management, and RF/digital signals. Copper islands may be added within the PCB, for example using ray-tracing based analysis, where the function of the copper islands is to shield radiation sensitive electrical components of the DRA assembly.

In some embodiments, the DRA may further comprise a sunshield over the antenna aperture, for thermal management, such that temperature extremes may be reduced. Such a sunshield may provide protection against direct radiation exposure to atomic oxygen ram flux.

Referring now to FIG. 1, shown therein is a perspective view of a direct radiating array ("DRA") antenna assembly 100-1, according to an embodiment.

The assembly 100-1 of FIG. 1 is a transmit (Tx) configured direct radiating array assembly 100-1. Assembly 100-1 is configured to be coupled to a spacecraft, to enable communication from the spacecraft to another spacecraft or to a ground terminal or mobile terminal. In other embodiments, the assembly 100-1 may be used as a ground terminal on a mobile or stationary platform or structure. For example, assembly 100-1, or other embodiments thereof, may be coupled to a vehicle, car, truck, cargo container, aircraft, mobile home, boat, cruise ship, yacht, building, mast (cellular or radio) or structure other than a spacecraft.

Assembly 100-1 is configured to receive a digital input signal from an onboard processor of the spacecraft, perform a digital beamforming operation on at least a portion of the digital input signal, and transmit a beamformed RF signal corresponding to at least a portion of the digital input to another terminal (e.g. mobile terminal such as a spacecraft or ground terminal). In other embodiments, the DRA assembly may be configured to perform an analogue beamforming operation, and may receive an analogue and/or RF input signal.

Generally, the assembly 100-1 may be a phased array antenna assembly including a collection of antenna/radiating elements 112-1 assembled together such that the radiation pattern of each individual radiating element 112-1 constructively combines with neighboring radiating elements 112-1 to form an effective radiation pattern called a main lobe. The main lobe transmits radiated energy in a desired location while the assembly 100-1 is designed to destructively interfere with signals in undesired directions, forming nulls and side lobes. The assembly 100-1 may be designed to maximize the energy radiated in the main lobe while reducing the energy radiated in the side lobes to an acceptable level. The direction of radiation may be manipulated by changing the phase of the signal fed into each antenna element 112-1. The result is that each antenna element 112-1 in the array has an independent phase and amplitude setting to form a desired radiation pattern. The assembly 100-1 uses digital circuit-based phase adjustments to change the direction of the radiation pattern.

Assembly 100-1 may operate in dual polarization or single polarization and may be configured to operate in any RF frequency band.

Assembly 100-1 comprises front printed circuit board (PCB) housing 102-1, calibration antennas 104-1, a PCB 106-1, having a front side 108-1 and rear side 110-1 (as depicted in FIG. 3), and an interface plate 114-1. Front side 108-1 additionally comprises an array of radiating elements 112-1, wherein each element 112-1 is an antenna configured to transmit a radio frequency signal. In an embodiment, the radiating elements may be patch radiating elements. In other embodiments, the radiating elements may be another type of radiating element. For example, the radiating elements may be dipole or printed spirals. Assembly 100-1 is configured such that assembly 100-1 has a lower profile than other dynamic radiating array antenna assemblies.

Front PCB housing 102-1 is a structural component configured to secure the PCB 106-1 to the interface plate 114-1. Front PCB housing 102-1 comprises a metal frame, configured to fit over and around PCB 106-1, such that front PCB housing 102-1 may secure PCB 106-1 when front PCB housing 102-1 is secured to another structure or surface. Front PCB housing 102-1 may include a plurality of mounting holes, such that machine screws or bolts, or other mechanical fasteners may be used to secure front PCB housing 102-1 to another component, such as interface plate 114-1. In the example of FIGS. 1-3, front PCB housing 102-1 is constructed from metal. In other examples, front PCB housing 102-1 may be constructed from other materials, such as polyetheretherketone, carbon fiber, other polymers or other composite materials. Front PCB housing 102-1 may be machined, welded, brazed, casted, or additively manufactured. Front PCB housing 102-1 may provide added radiation shielding in limited directions for the electronic components attached to the rear side 110-1 of the PCB 106-1 if constructed from a radiation shielding material such as a metal.

Calibration antennas 104-1 comprise antenna devices configured to receive RF signals of the same RF band as emitted by assembly 100-1, such that the output of radiating elements 112-1 may be assessed by calibration antennas 104-1. Assembly 100-1 comprises a plurality of calibration antennas 104-1, wherein each calibration antenna 104-1 is mounted to interface plate 114-1 or otherwise mechanically integrated into interface plate 114-1. In other embodiments, calibration antennas 104-1 may be mechanically integrated into assembly 100-1 through other components. In an embodiment, the number of calibration antennas may be four. Each calibration antenna 104 may acquire the received RF signal data and pass this acquired data back to an onboard processor of the spacecraft and or assembly 100-1, such that the RF transmission parameters of assembly 100-1, such as beamforming parameters, may be adjusted according to the feedback received from calibration antennas 104-1. Such adjustments may enable greater RF performance or assembly 100-1 longevity, as the assembly 100-1 may be adjusted to account for aging effects, temperature variations, or other factors. In some examples, calibration electronics associated with calibration antennas 104-1 may be integrated into or mounted onto PCB 106-1, and/or integrated into beamforming circuitry.

PCB 106-1 is a multi-layer printed circuit board, comprising a front side 108-1 and rear side 110-1 (pictured in FIG. 3). PCB 106-1 is a generally rectangular circuit board, with cropped corners, such that PCB 106-1 comprises four long edges, and four short edges. The number of layers in the PCB may vary. In other embodiments, PCB 106-1 may comprise fewer or more layers. In embodiments employing analogue beamforming, PCB 106-1 may comprise more layers. In other examples, the PCB may comprise a different shape, such as a round or hexagonal shape.

On the front side 108-1, PCB 106-1 includes an array of patch radiating elements 112-1. Each element 112-1 is an antenna configured to transmit a radio frequency signal. Each patch radiating element 112-1 is a generally hexagonal antenna, with a generally circular exposed metal portion. Each hexagonal radiating element 112-1 may be tessellated, such that radiating elements 112-1 generally cover a continuous surface of PCB 106-1, with few gaps. In some examples, each radiating element may be constructed from a gold, copper, aluminum, or silver alloy or plated with gold, copper, aluminum, silver or a gold, copper, aluminum or silver alloy. Each radiating element 112-1 is coupled to RF driving circuitry, such that each radiating element 112-1 is provided with a separate signal. The number of radiating elements 112-1 in the assembly 100-1 may be determined based on a number of design factors, such as tradeoff between power consumption, cost and/or directivity. In some examples, radiating elements 112-1 may comprise micromachined crossed dipoles with integrated polarizers and filters (for example, integrated into a single subassembly that can be mounted to the PCB 106-1), aluminum carrier chunks, air-gapped patches, integrated patches, waveguide elements, probe and cup elements, helix elements or other elements. In some examples, radiating element 112-1 may comprise square radiating elements, or round radiating elements arranged in a square grid. In variations, the radiating elements 112-1 may arranged in or placed on a square or rectangular lattice or irregular lattice.

On the rear side 110-1, PCB 106-1 includes a plurality of electrical components. The electrical components include surface mounted devices (SMDs). The SMDs are mounted onto the surface of the rear side 110-1 of PCB 106-1. The SMDs may be mounted to the surface 110-1 using a bonding technique, or through a connectorized interface. The connectorized interface may be, for example, a pin and socket interface. In an embodiment, the SMDs may be soldered onto the surface 110-1. In other embodiments, the SMDs may be mounted to the surface 110-1 using other suitable bonding technique. SMDs may include amplifiers, filters, polarizers, and analogue or digital beamforming circuitry. In some cases, SMDs may be mounted to the PCB 106-1 indirectly through another SMD (e.g. by mounting one SMD to another). Digital beamforming circuitry may include a plurality of integrated circuits, such as application specific integrated circuits (ASICs). In other embodiments, SMDs may further include capacitors, resistors, inductors, isolators, and other integrated circuits. Contacts present on SMDs mounted on rear side 110-1 may be routed to radiating elements 112-1 through PCB 106-traces, such that SMDs mounted on rear side 110-1 may drive radiating elements 112-1.

Assembly 100-1, due to its relatively low profile, may be particularly susceptible to radiation interference, as fewer inherently radiation shielding components may be between radiation sources and radiation sensitive components. In some embodiments, copper layers or planes may be present within PCB 106-1, such that electrical components on the rear side 110-1 of PCB 106-1 may be shielded from radiation. Some of these copper layers may be present for radiation shielding functionality only. For example, in a space-based application of assembly 100-1, front side 108-1 of PCB 106-1 may be exposed to outer space during operation of assembly 100-1. Radiation originating from outer space may strike the front side 108-1 of PCB 106-1. Radiation sensitive electrical components of the assembly 100-1 may be placed on rear side 110-1 of PCB 106-1, to limit radiation exposure. However, higher energy radiation may penetrate through PCB 106-1, through to rear side 110-1 of PCB 106-1, resulting in radiation exposure to sensitive electrical components placed on rear side 110-1 of PCB 106-1. The presence of radiation shielding copper layers within PCB 106-1 may advantageously prevent radiation from penetrating through PCB 106-1 and interfering with sensitive electrical components on the rear side 110-1 of PCB 106-1, as some radiation may not readily penetrate radiation shielding copper layers within PCB 106-1. Front PCB housing 102-1 may also reduce the probability of high energy radiation impinging on the PCB 106-1 from shallow angles, by shielding some radiation.

The placement and shape of radiation shielding copper layers within PCB 106-1 may be determined by an application of raytracing, wherein the operational positions and orientations of the spacecraft are known. The use of integrated PCB copper layers for radiation shielding, in comparison to discrete radiation shielding components, may enable the production of an assembly 100-1 with a smaller volume and/or mass, which may be advantageous for space applications in which volume and mass can be significant constraints.

Figure 2A:
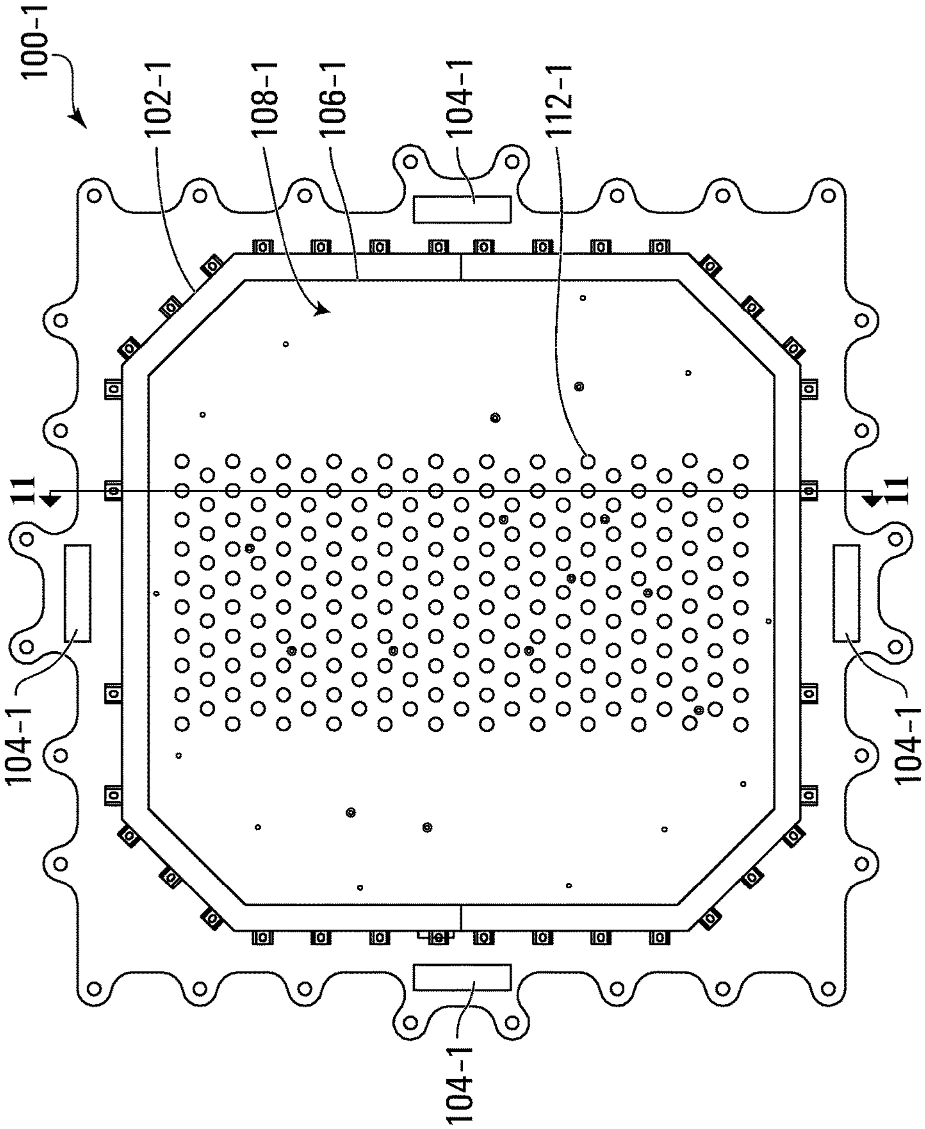
FIG. 2A is a top view of the transmit configured direct radiating array (DRA) antenna assembly of FIG. 1, according to an embodiment.
Figure 2C:
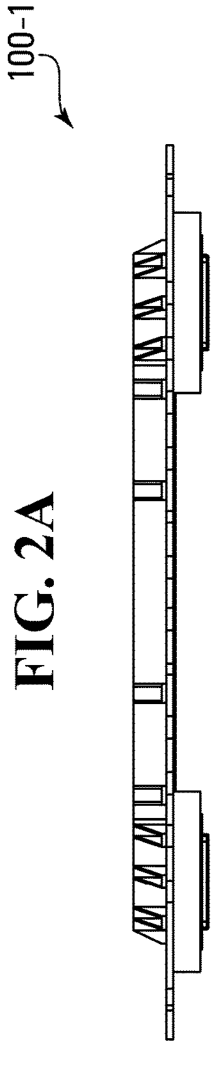
FIG. 2C is a side view of the transmit configured direct radiating array (DRA) antenna assembly of FIG. 1, according to an embodiment.
Figure 2B:
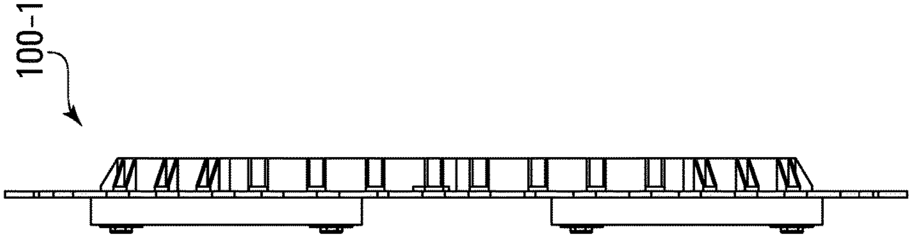
FIG. 2B is a front view of the transmit configured direct radiating array (DRA) antenna assembly of FIG. 1, according to an embodiment.

Referring now to FIGS. 2A-2C (collectively referred to as FIG. 2), shown therein is an isometric projection of the assembly 100-1 of FIG. 1, including top, side and front views, respectively. Visible in the isometric projection is the front and side of assembly 100-1. The embodiment of FIGS. 1-2 comprises a relatively low-profile assembly 100-1, as seen in the front and side views of FIGS. 2C and 2B respectively.

Figure 3B:
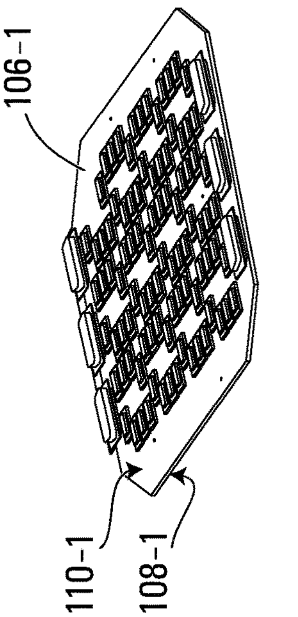
FIG. 3B is an extension of the exploded view of the transmit configured direct radiating array (DRA) antenna assembly of FIG. 3A, according to an embodiment.
Figure 3A:
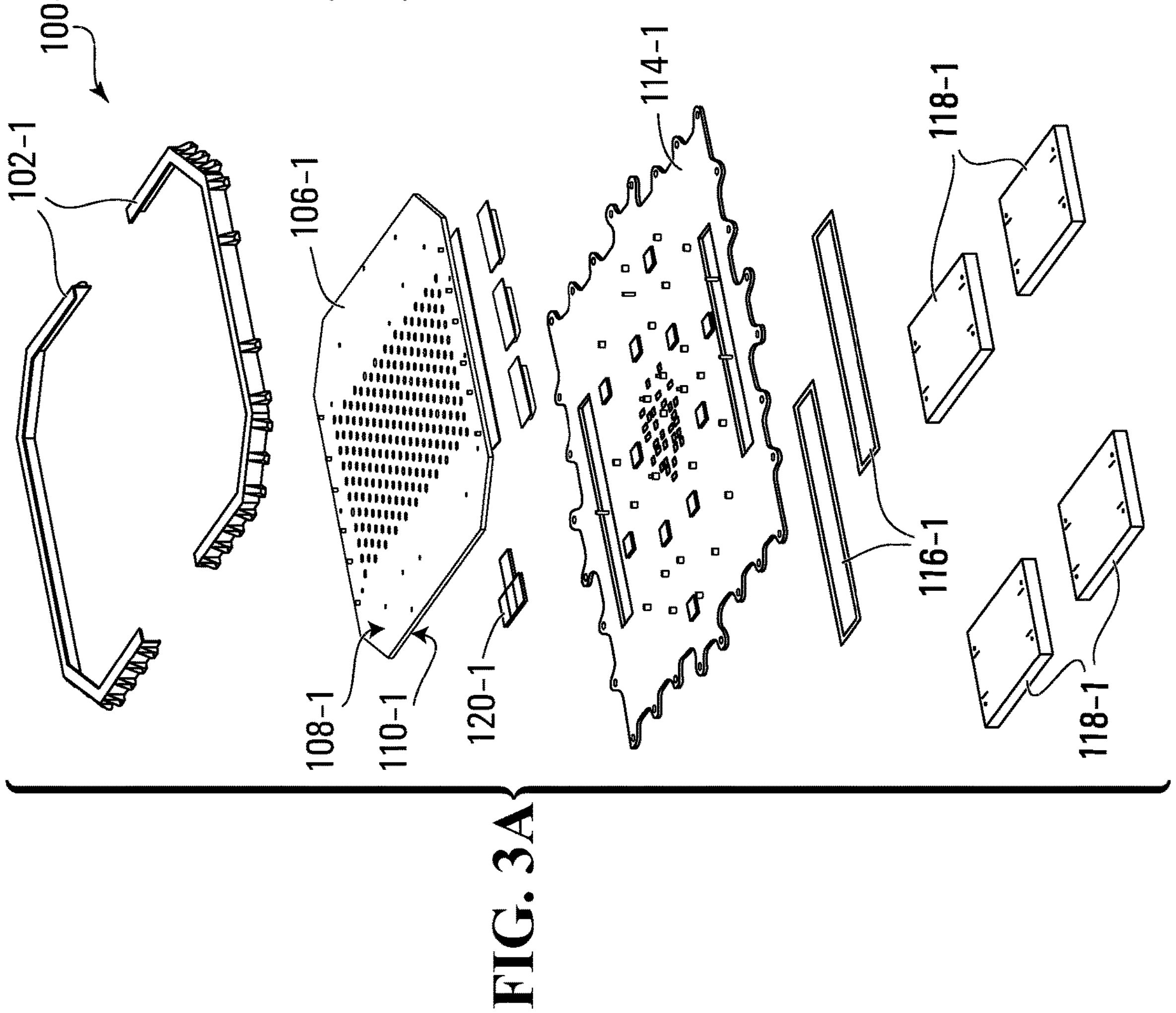
FIG. 3A is an exploded view of the transmit configured direct radiating array (DRA) antenna assembly of FIGS. 1-2, according to an embodiment.

Referring now to FIGS. 3A and 3B (collectively referred to as FIG. 3), shown therein is an exploded view of the assembly 100-1 of FIGS. 1 and 2. Also shown in FIG. 3 are connector covers 116-1, electrical power converters (EPCs) 118-1 (mounted around or below PCB 106-1), and RF chains 120-1. Connector covers may include covers for digital, radio frequency, telemetry and telecommand interfaces, or power connectors.

Interface plate 114-1 is a generally planar plate. The interface plate 114-1 is configured to attach to front PCB housing 102-1, such that PCB 106 may be securely fixed between interface plate 114-1 and front PCB housing 102-1 when interface plate 114-1 and front PCB housing 102-1 are secured to one another.

Interface plate 114-1 includes a plurality of mounting holes for mounting the assembly 100-1 to a spacecraft by attaching interface plate 114-1 to the spacecraft with mechanical fasteners. The mechanical fasteners may be, for example, machine screws.

Interface plate 114-1 is configured to promote heat transfer away from heat producing or dissipative components of assembly 100-1. Interface plate 114-1 is preferably constructed from a material with a high thermal conductivity, such as, for example, aluminum alloys, controlled expansion tailored metals with customizable ratios of fiber, particulate or powder filling, copper or copper alloys. Interface plate 114-1 is configured such that heat producing components of assembly 100-1 may readily conduct heat into interface plate 114-1. For example, a surface of interface plate 114-1 may match the height variation of electrical components present on the rear side 110-1 of PCB, such that the electrical components may be in physical contact with interface plate 114-1, enabling heat conduction from the electrical components into the interface plate 114-1.

In the example of FIGS. 1-3, interface plate 114-1 further comprises microfluidic channels. The microfluidic channels may be passive fluidic channels. The microfluidic channels are configured to promote greater heat transfer through the interface plate 114-1. The microfluidic channels may be filled with a conductive fluid, which may improve the overall heat conductivity of the interface plate 114-1. In some examples, the conductive fluid may comprise a multiphase fluid comprising a phase change point at a temperature near the operating temperature of assembly 100-1, such that conductive fluid may undergo phase changes during operation of assembly 100-1, which may further increase the overall heat conductivity of interface plate 114-1. Fluidic channels in the interface plate 114-1 may enable handling of higher heat fluxes in a lower volume, which may provide significant mass savings. In some embodiments, the fluidic channels of the interface plate 114-1 may be routed to the perimeter of the array. Thermal interface materials may be selected to connect dissipative electrical, electronic, and electromechanical components of the DRA 100-1 to the thermal interface plate 114-1 which exercise only a small compression force. In other embodiments, copper and or water filled heat pipes may be integrated into interface plate 114-1 to promote greater heat transfer rates.

Connector covers 116-1 comprise physical covers which may be placed on top of connector components present on PCB 106-1. Connector covers 116-1 may protect covered protectors from physical and chemical damage.

EPCs 118-1 comprise electrical power supply components configured to receive supply power from a spacecraft power source, and output electrical power with the specifications required to supply components of assembly 100-1 with electrical power. In some embodiments, EPCs 118-1 may be mounted directly to interface plate 114-1 or mounted remotely and connected to assembly 100-1 with cables.

RF chains 120-1 comprise electrical components configured to receive digital input signals from an onboard processor of the spacecraft and output a driving signal to a radiating element 112-1. RF chains 120-1 may comprise digital beamforming circuitry (for example, ASICs), digital to analogue converters, amplifiers, polarizers, filters and other integrated circuits.

Figure 4:
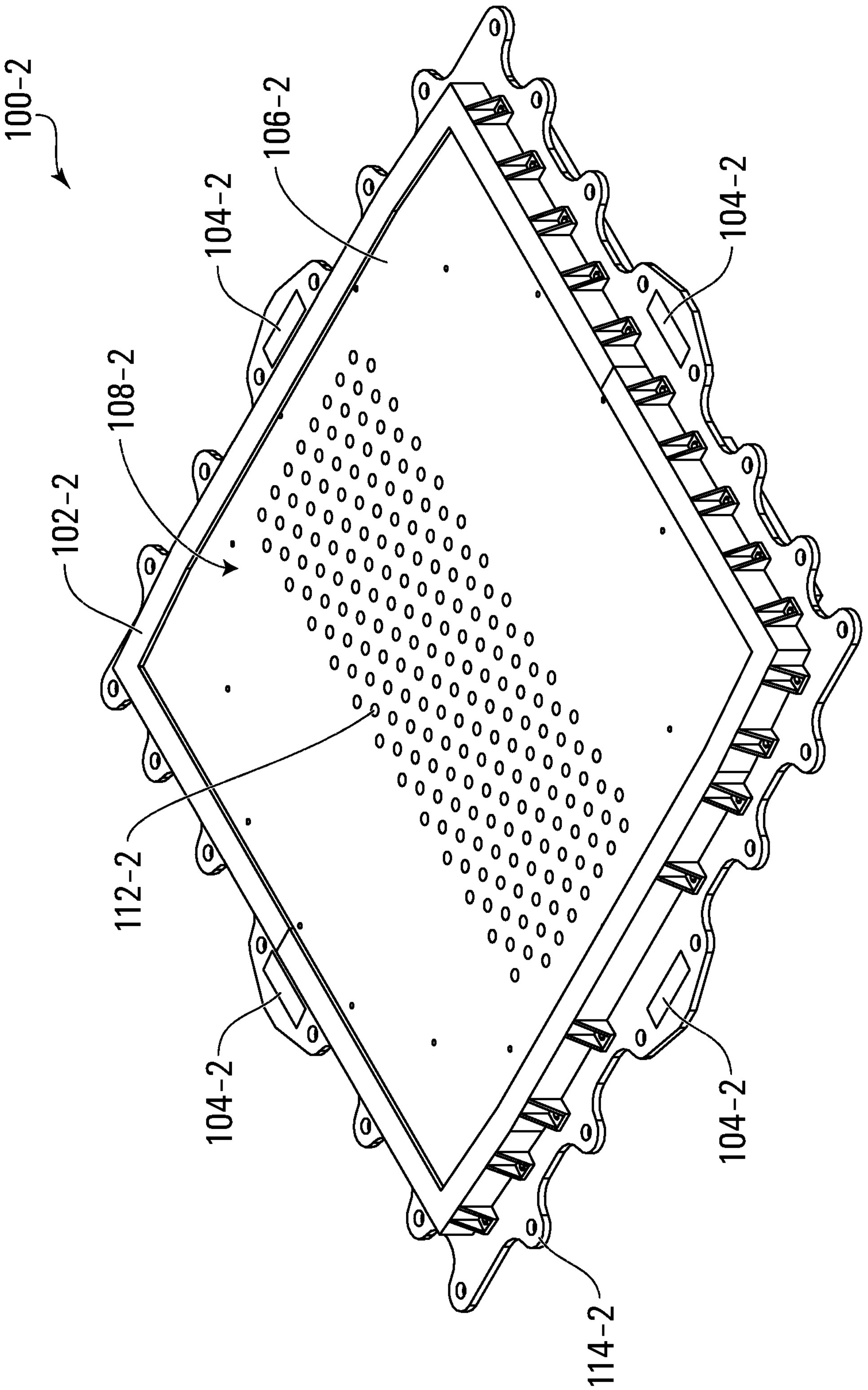
FIG. 4 is a perspective view of a receive configured direct radiating array (DRA) antenna assembly, according to an embodiment.
Figure 5A:
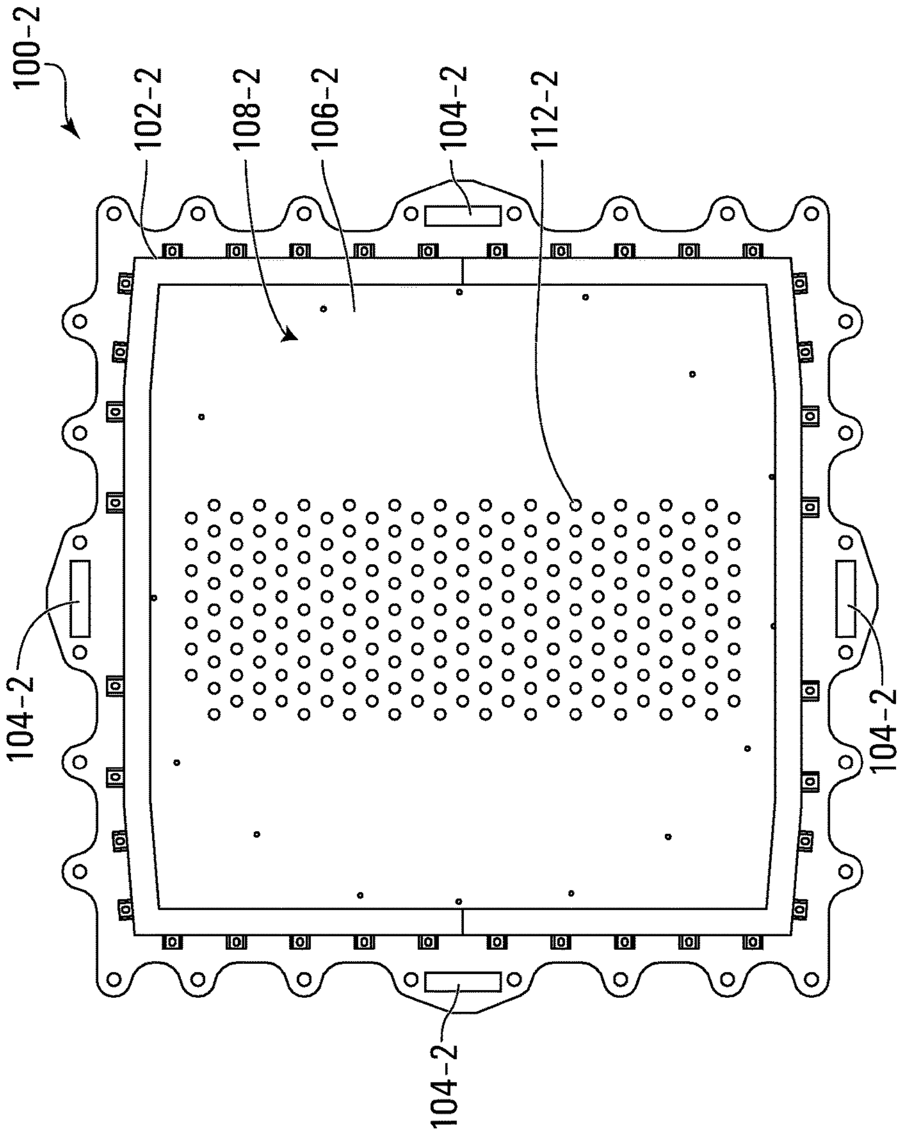
FIG. 5A is a top view of the receive configured direct radiating array (DRA) antenna assembly of FIG. 4, according to an embodiment.
Figure 5C:
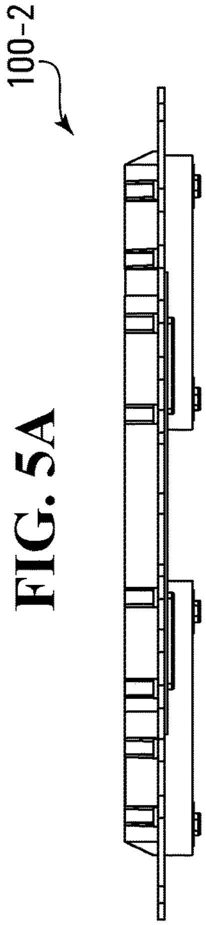
FIG. 5C is a front view of the receive configured direct radiating array (DRA) antenna assembly of FIG. 4, according to an embodiment.
Figure 5B:
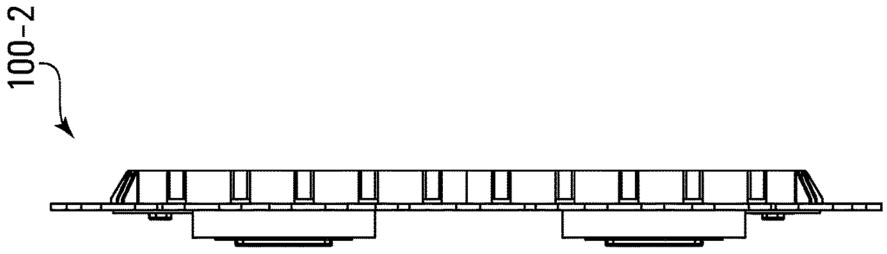
FIG. 5B is a side view of the receive configured direct radiating array (DRA) antenna assembly of FIG. 4, according to an embodiment.
Figure 6B:
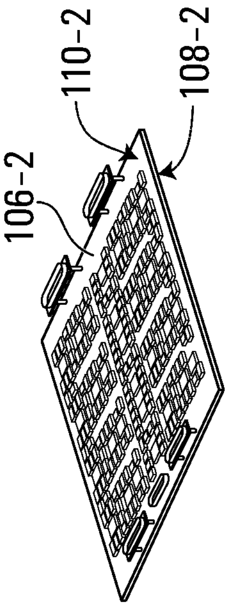
FIG. 6B is an extension of the exploded view of the receive configured direct radiating array (DRA) antenna assembly of FIG. 6A, according to an embodiment.
Figure 6A:
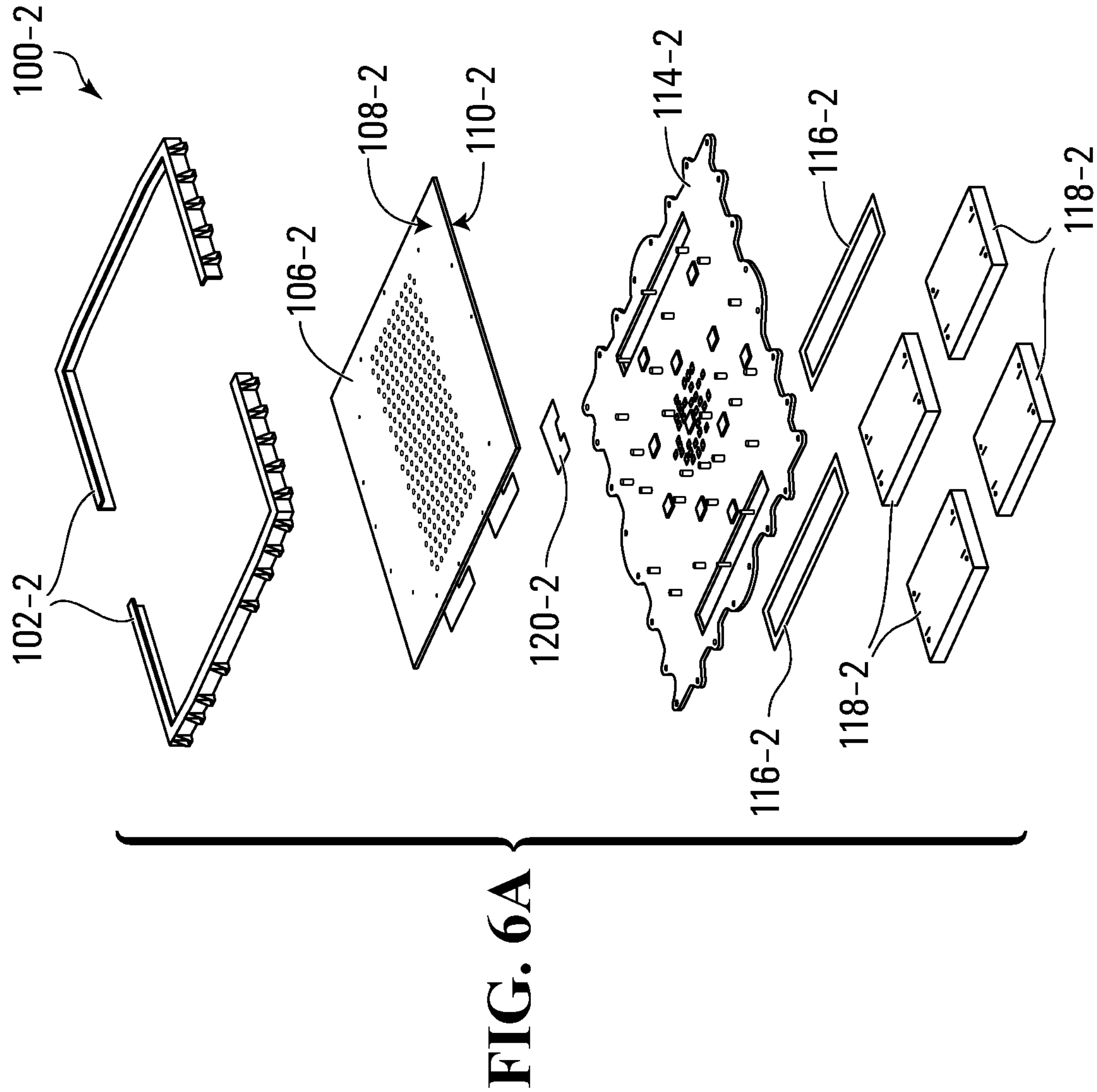
FIG. 6A is an exploded view of the receive configured direct radiating array (DRA) antenna assembly of FIGS. 4-5, according to an embodiment.

Referring now to FIGS. 4-6, shown therein are various views of a receive (Rx) configured direct radiating array assembly 100-2, according to an embodiment. FIGS. 4-6 are analogous to FIGS. 1-3, respectively. Description provided above in reference to FIGS. 1-3 applies to FIGS. 4-6. Assembly 100-2 differs from assembly 100-1 in that assembly 100-2 is configured to receive RF signals, while assembly 100-1 is configured to transmit beamformed RF signals. Assembly 100-2 comprises analogous components to assembly 100-1. Description of components with reference characters appended with "−1" correspond to components with reference characters appended with "−2".

The Rx DRA assembly 100-2 may operate in dual polarization or single polarization or may be configured to operate in L/S frequency bands or C frequency band (e.g. a L/S or C flat DRA).

RF chains 120-2 are configured to receive RF signals received by radiating elements 112-2 as an input and convert the RF signals into beamformed digital signals that may be provided and parsed by an onboard processor of a spacecraft.

Thermal design of assembly 100-2 may differ, as fewer/lower output dissipating components may be present in Rx assembly 100-2, which may require less thermal control hardware, and smaller thermal interfaces.

Figure 7:
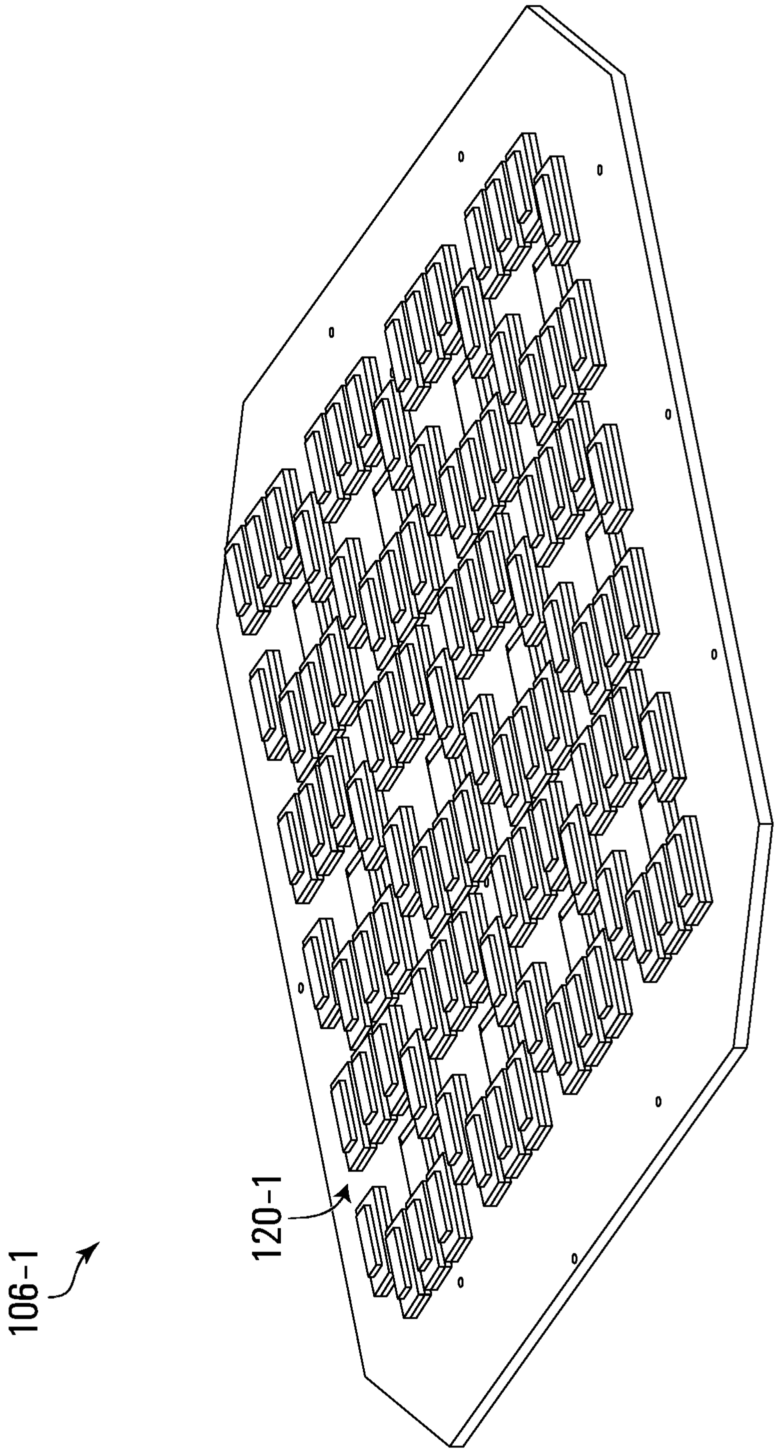
FIG. 7 is a perspective view of the PCB of the transmit configured direct radiating array (DRA) antenna assembly of FIGS. 1-3, according to an embodiment.

Referring now to FIG. 7, shown therein is a detailed perspective view of rear side 110-1 of PCB 106-1 of assembly 100-1 in isolation.

Visible on PCB 106-1 are a plurality of RF chain components 120-1. In the embodiment of FIGS. 1-3 and 7, 96 stacks of RF chain components 120-1 are pictured. In other embodiments of assembly 100-1, 100-2, a different number of sets of RF chain components 120-1 may be present. The number of RF chain components 120-1 may be generally proportional to the total number of radiating elements 112-1 of each assembly 100-1. In assembly 100-1, 96 stacks of RF chain components feed 212 total radiating elements 112-1. In other embodiments, fewer or more stacks of RF chain components may be present for a fixed number of radiating elements. The number of components in an individual stack may vary in embodiments.

Generally, RF chain components 120-1 associated with a radiating element 112-1 may be positioned directly opposite the radiating element, across the PCB 106-1. This may minimize the conductive path length between radiating elements 112-1 and associated driving components in order to limit RF losses and signal degradation. For example, a radiating element positioned at the center of front side 108-1 of PCB 106-1 may be driven by RF chain components 120-1 positioned at the center of rear side 110-1 of PCB 106-1. While RF chain components 120-1 are generally positioned directly opposite the radiating element, in some embodiments, some RF chain components (e.g. filters and/or polarizers) may be placed in other positions, or on the front side 108-1 of the PCB.

Figure 8:
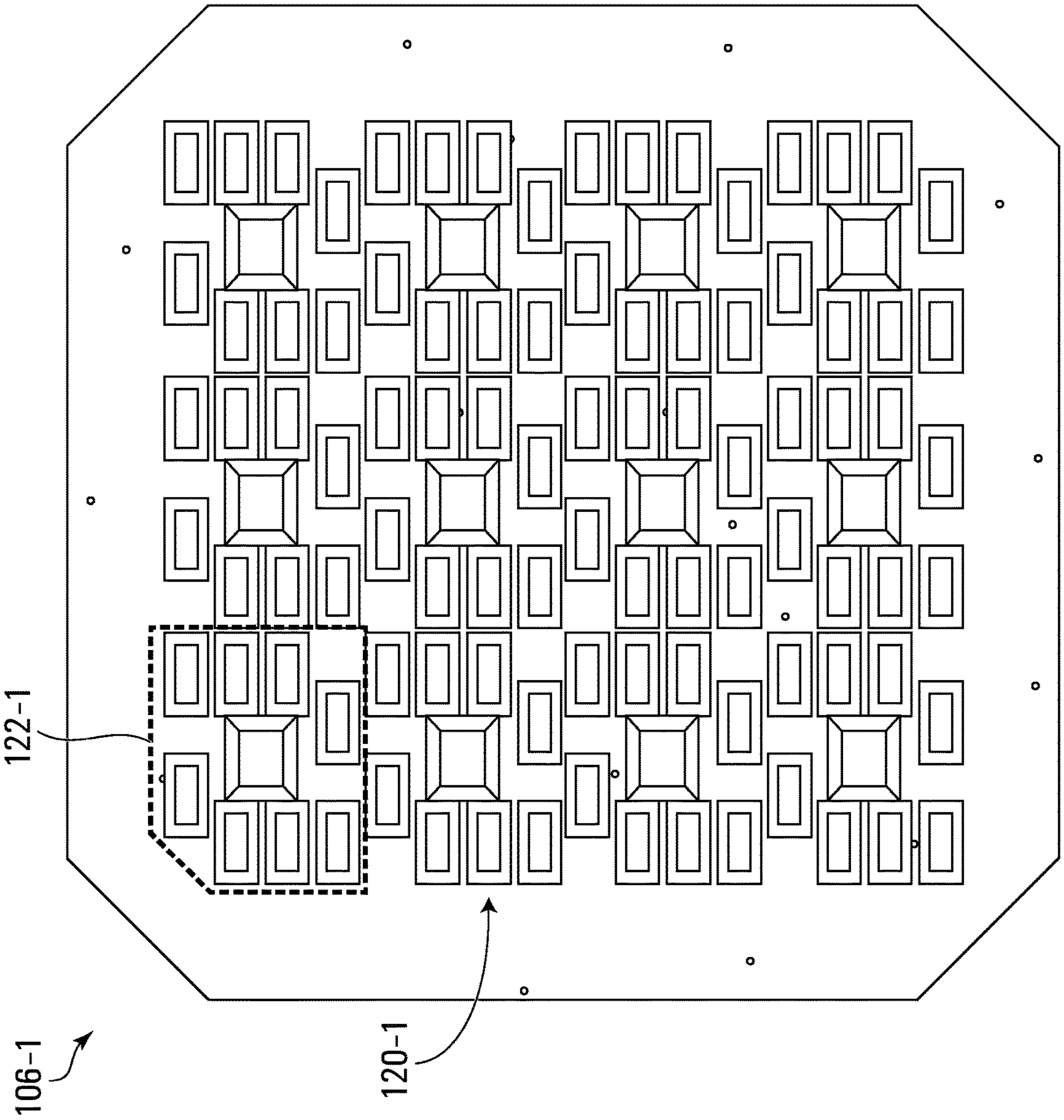
FIG. 8 is a plan view of the PCB of the transmit configured direct radiating array (DRA) antenna assembly of FIG. 1-3, according to an embodiment.

Referring now to FIG. 8, shown therein is a detailed plan view of rear side 110-1 of PCB 106-1, in isolation.

Visible in FIG. 8 are the plurality of RF chain components 120-1 coupled to rear surface 110-1 of PCB 106-1, such that spacing between components may be visualized. Additionally visible in FIG. 8 is a depiction of an RF chain cluster 122-1. RF chain cluster 122-1 comprises a group of eight RF chain components 120-1 in a specific arrangement. PCB 106-1 comprises 12 total RF chain clusters 122-1. In variations, the number of RF chain clusters 122-1 and number of RF chain components 120-1 in an individual RF chain cluster 122-1 may vary.

Figure 9:
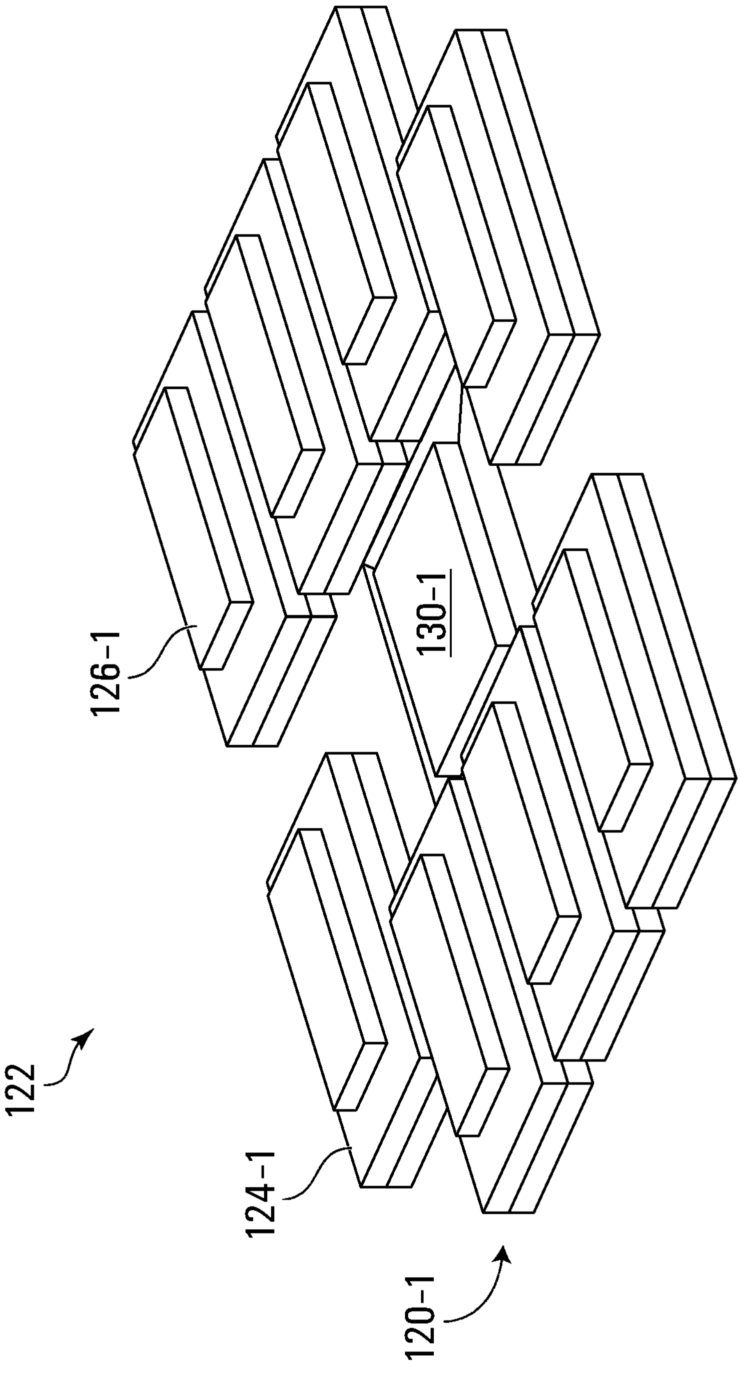
FIG. 9 is a perspective view of an RF chain cluster of the transmit configured direct radiating array (DRA) antenna assembly of FIGS. 1-3 in isolation, according to an embodiment.

Referring now to FIG. 9, shown therein is a detailed perspective view of a single RF chain cluster 122-1 in isolation. While the terms “top”, “above”, “below” and “bottom” are used throughout, these terms are intended to describe relative positions of electrical components of assembly 100-1. Terms are defined relative to rear surface 110-1. Components in contact with rear surface 110-1 are deemed to be at the “bottom” of the three-dimensional stack. Components farthest from rear surface 110-1 are deemed to be at the “top” of the stack. “Above” and “below” are defined relative to rear surface 110-1, wherein the perpendicular direction away from rear surface 110-1, is defined as “above”, while the perpendicular direction towards rear surface 110-1 is defined as “below”. The “vertical” direction is defined as perpendicular to rear surface 110-1, while the “horizontal” direction is defined as parallel to rear surface 110-1.

Visible in FIG. 9 are the plurality of electrical components coupled to rear surface 110-1 of PCB 106-1 (not shown in FIG. 9), comprising the RF chain components 120-1. In some examples, some components may be integrated into PCB 106-1, for example, as a stripline, or coupled to the front side 108-1 of PCB 106-1.

The plurality of electrical components include filters 124-1, system-in-packages (SIPs) 126-1, and digital beamforming integrated circuits 130-1. Each SIP may include amplifiers, filters and hybrid components. In the embodiment of FIG. 9, two filters 124-1, and one SIP form an RF chain component 120. The RF chain component 120, as configured in stacking configuration as shown in FIG. 9 may be referred to as a stacked RF chain, stacked package, or RF chain component stack. In other embodiments, the number of each component in a stack may vary. In some embodiments, hermetically enclosed monolithic microwave integrated circuits or other components may be used in place of SIPs. Each SIP may include a plurality of RF channels. The number of filters 124-1 in the stack may correspond to the number of RF channels in the SIP.

In embodiments employing analogue beamforming, analogue beamforming integrated circuits may be present, and may comprise high power amplifiers. In some examples, analogue beamforming integrated circuits may be packaged within SIPs. Generally, embodiments employing analogue beamforming will include a greater number of components/integrated circuits, as the circuit design for analogue beamforming may be more complex.

Visible in FIG. 9 is the three-dimensional component stacking arrangement of assembly 100. For example, SIP 126-1 is stacked above filter 124-1, wherein filter 124-1 is arranged such that two filters 124-1 are stacked above one another on the PCB 106-1. This three-dimensional component stacking arrangement results in a more space efficient component arrangement. For a given volume and PCB 106-1 area, a greater number of electrical components may be placed onto the PCB 106-1 if a three-dimensional component stacking arrangement is used, than if a more traditional two-dimensional arrangement is used. For example, for a fixed component spacing, in a two-dimensional component arrangement, a PCB with a larger area would be required to support the same number of components as with a three-dimensional component arrangement. Additionally, three-dimensional component arrangement will better resist fatigue failure, due to thermal fluctuations.

In this embodiment, two filters 124-1 are stacked consecutively, such that the bottom surface of the two filters 124-1 stack may be coupled to rear surface 110-1 of PCB 106-1, while the top surface of the two filter 124-1 stack may be free to receive another component above. In other embodiments, many more filters 124-1 may be assembled in a single stack.

A SIP 126-1 is coupled or mounted to the top surface of two filters 124-1, such that SIP 126-1 is above both filters 124-1 (the filter stack).

In this embodiment, a component stack that feeds 2 radiating elements may include 2 filter modules. Components are stacked vertically on top of one another.

Stacks may be vertically stacked, and stacks may be horizontally arranged of on PCB 106-1.

In other embodiments, other component stacking arrangements may be employed.

The volumetrically efficient component arrangement illustrated in FIG. 9 may enable construction of DRA assembly with a lower mass and volume. As spacecraft launch costs and service life may be proportional to overall mass, a volumetrically efficient component arrangement may reduce launch costs and service life of the spacecraft to which assembly 100 is coupled.

Figure 10:
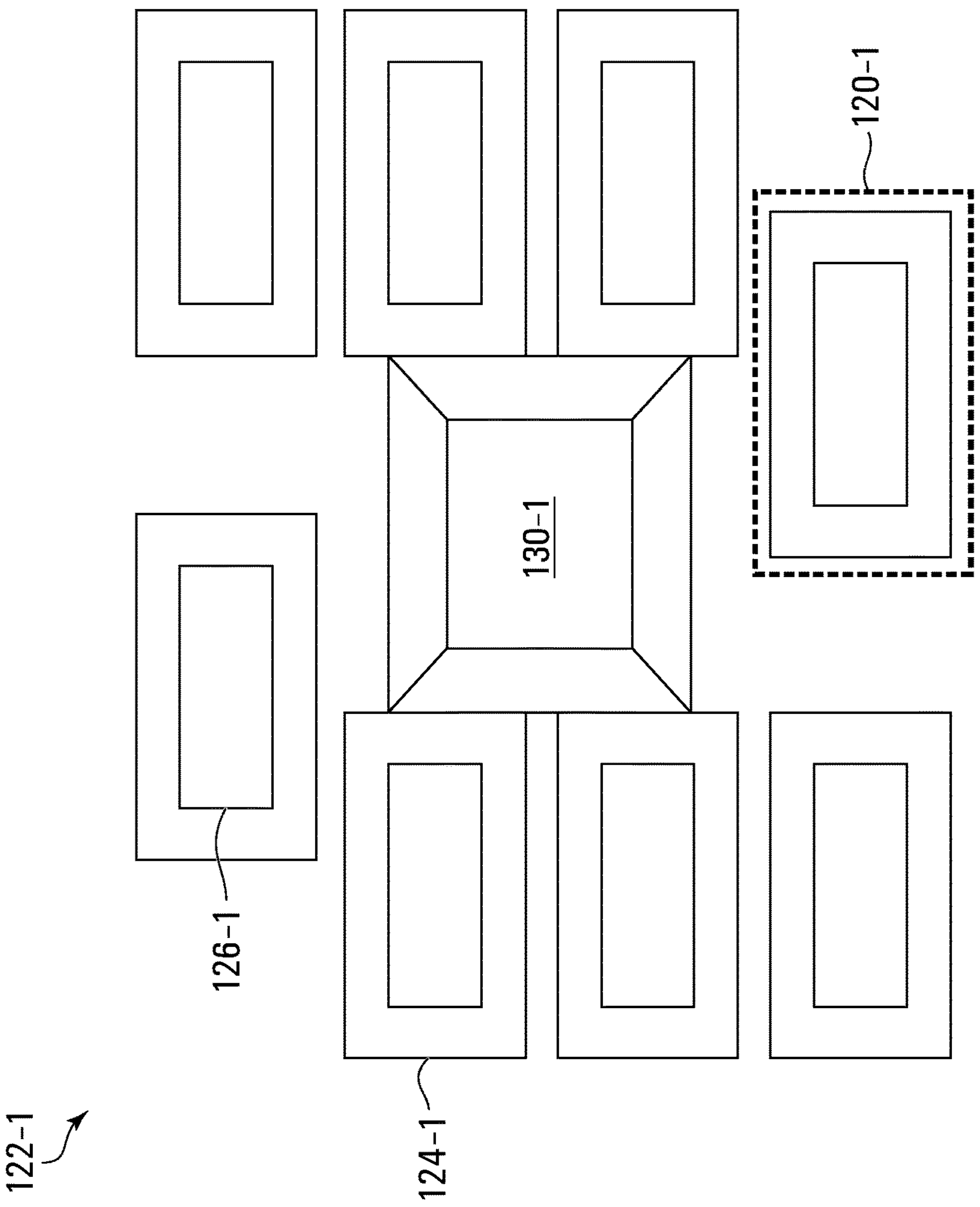
FIG. 10 is a plan view of an RF chain cluster of the transmit configured direct radiating array (DRA) antenna assembly of FIGS. 1-3 in isolation, according to an embodiment.

Referring now to FIG. 10, shown therein is a detailed plan view of an RF chain cluster 122-1. Through the use of SMD technology and specific component layouts, a very dense component spacing is achievable, as pictured in FIG. 10, in addition to very short RF and DC paths resulting in lower losses and higher DC efficiency than other more conventional layouts.

Figure 11:
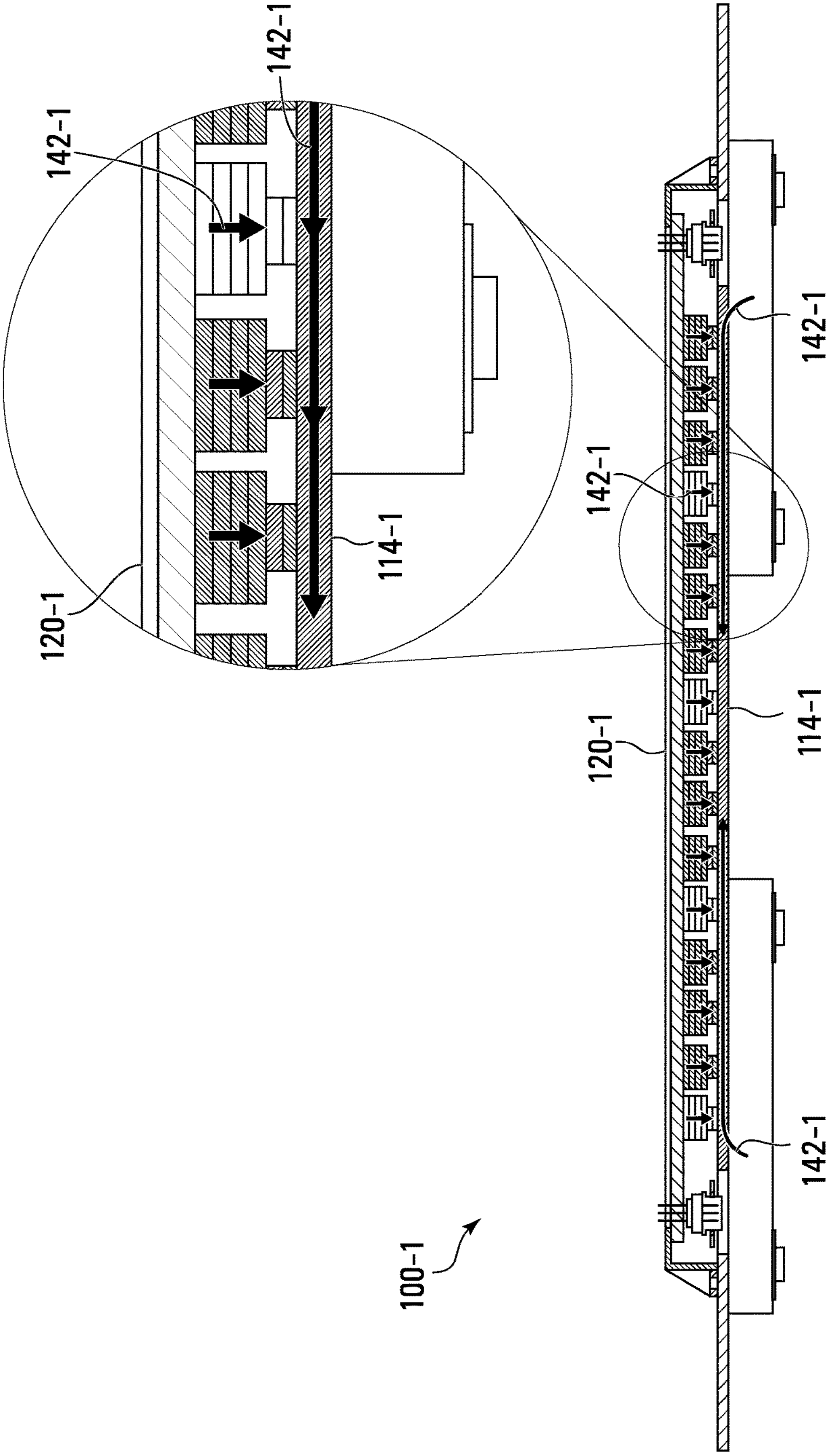
FIG. 11 is a cross-sectional view of the transmit configured direct radiating array (DRA) antenna assembly of FIGS. 1-3, according to an embodiment.

Referring now to FIG. 11, shown therein is a cross sectional view of assembly 100-1.

As shown in FIG. 11, RF chain components 120-1 are in physical contact with interface plate 114. Assembly 100-1 is configured such that driving electronics of Assembly 100-1 are positioned on a single side (rear side 110-1) of PCB 106-1. This may provide for simpler and more effective thermal management of assembly 100-1.

Assembly 100-1 is additionally configured such that higher heat producing RF chain components are placed at the uppermost position of the RF chain 120-1 three-dimensional arrangement and closest to the interface plate 114-1. In such a configuration, heat may be readily conducted from the uppermost RF chain components, including SIP 126-1, into interface plate 114-1. Heat flows 142-1 may be seen in FIG. 11, depicting the direction of heat flow through assembly 100-1.

In some embodiments of assembly 100-1, contacting surfaces of interface plate 114-1 and RF chain components 120-1 may be treated to encourage heat transfer from RF chain components 120-1 to interface plate 114-1. For example, contacting surfaces of interface plate 114-1 and RF chain components 120-1 may be polished to improve surface contact, or may be treated with a thermal compound to promote heat transfer across the RF chain component 120-1-interface plate 114-1 interface.

Figure 12:
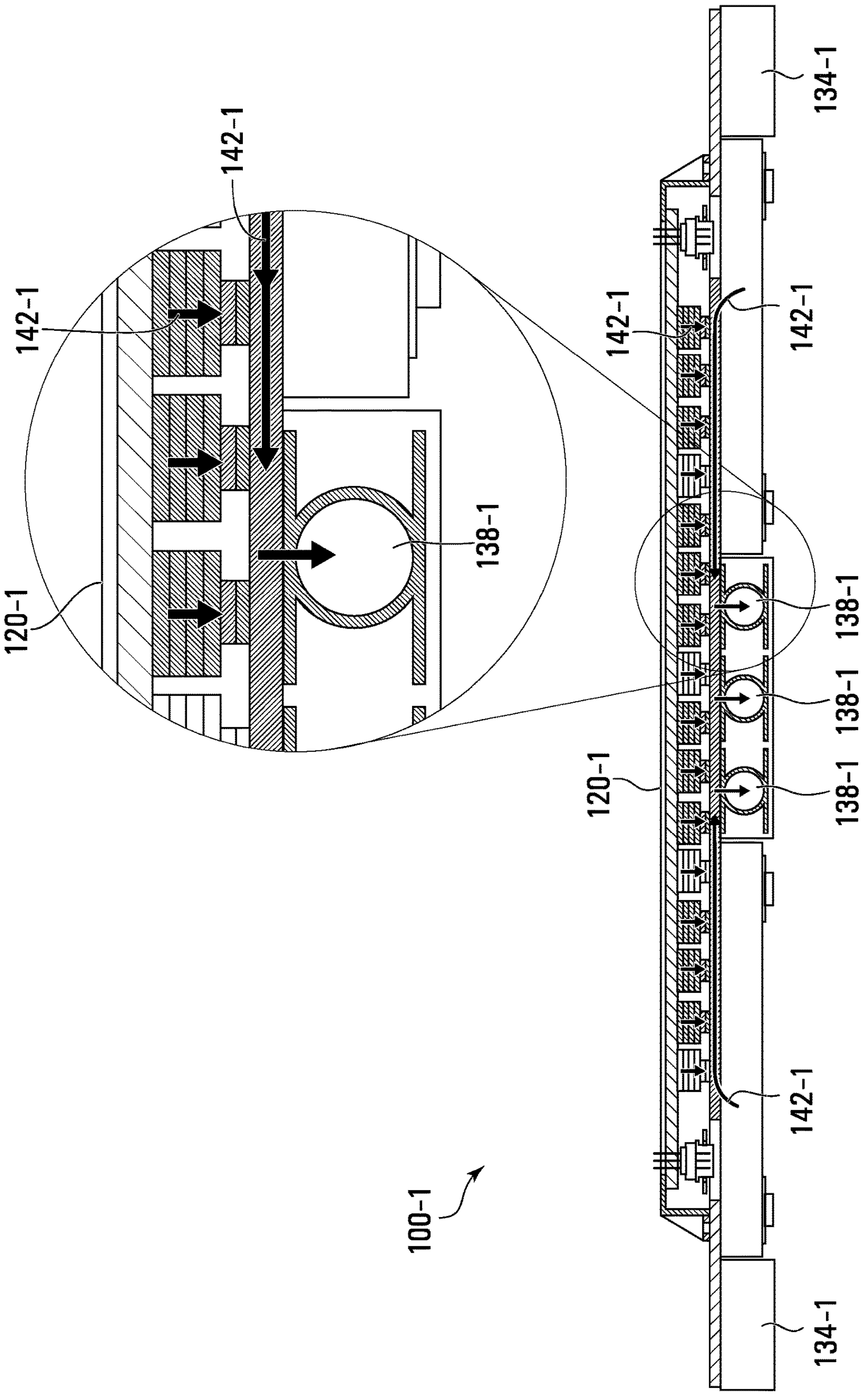
FIG. 12 is a cross-sectional view of the transmit configured direct radiating array (DRA) antenna assembly of FIGS. 1-3, including spacecraft heat pipes, illustrating heat transfer from the DRA to the heat pipes, according to an embodiment.

Referring now to FIG. 12, shown therein is a cross sectional view of assembly 100-1 of FIGS. 1-3, and 11. Additionally pictured are heat pipes 138-1, and spacecraft 134-1 and heat flows 142-1.

Spacecraft 134-1 is the spacecraft on which assembly 100-1 is mounted and operated. The spacecraft 134-1 may comprise a satellite. In some embodiments, the satellite may be a low-earth orbit (LEO) satellite. In other embodiments, assembly 100-1 may be mounted onto other vehicles, or stationary or mobile structures, as previously described.

Heat pipes 138-1 comprise thermal management components of spacecraft 134-1. Heat pipes 138-1 may be a primary thermal pathway of the spacecraft 134-1, wherein heat producing components of spacecraft 134-1 are arranged such that heat may be transferred into heat pipes (e.g. through conduction), and therefore away from heat generating components.

Heat pipes 138-1 must be maintained at a temperature below the operating temperature of heat generating components to enable heat conduction from heat generating components to heat pipes 138-1. In some examples, spacecraft 134-1 may further comprise a thermal radiator, coupled to heat pipes 138-1, such that heat may be radiated out of heat pipes 138-1 and into outer space or transferred from heat pipes 138-1 to thermal radiator (such as a panel radiator) and from the radiator into space, reducing or maintaining the temperature of heat pipes 138-1, such that an effective temperature gradient is maintained.

The use of spacecraft central heat pipes 138-1 for thermal management of assembly may reduce the cost, complexity, mass and volume of assembly 100-1, as a separately designed and implemented heat removal system may not be required for assembly 100-1. Additionally, the use of spacecraft central heat pipes 138-1 may help to avoid the need for additional heat transfer devices in the assembly 100-1, beyond interface plate 114-1, or the need to reconfigure or add to the thermal management subsystem/infrastructure of the spacecraft such as by routing spacecraft heat pipes on top of the assembly 100-1. Heat pipes may be routed on an earth facing panel of the spacecraft, between assembly 100-1 and an earth facing panel of the spacecraft, or under assembly 100-1 and within an earth facing panel of the spacecraft. In other embodiments, heat pipes may be routed anywhere within the spacecraft. In other embodiments, heat transfer technologies other than heat pipes may be implemented as part of the spacecraft thermal control subsystem, and used to thermally manage assembly 100-1. In other embodiments, heat pipes may be alternatively mounted to the underside/opposite side of interface plate 114-1.

Assembly 100-1 may be configured such that central radiating elements 112-1 of assembly 100-1 transmit RF signals at a higher power level than peripheral radiating elements 112-1. As previously described, driving components of each radiating element 112-1 are placed generally directly opposite the radiating element, on the other side of the PCB 106-1. As a result, components associated with central radiating elements 112-1 generally consume more electrical power during operation and generate more heat that needs to be dissipated. Heat pipes 138-1 in FIG. 12 are in a relative position underneath the most central radiating elements 112-1 of assembly 100-1, such that the components that generate the most heat are closer to the heat pipes 138-1, thereby increasing heat removal performance of assembly 100-1.

Description above in reference to FIGS. 11 and 12 may apply to assembly 100-2. The heat transfer method depicted in FIGS. 11 and 12 is identical in operation to the heat transfer method that may be applied in Rx assembly 100-2, and differs only in the composition of RF chain 120-2 and interface plate 114-2 versus RF chain 120-1 and interface plate 114-1, as different components of each RF chain will generate and dissipate heat, and interface plates of different shapes may be required.

Figure 13:
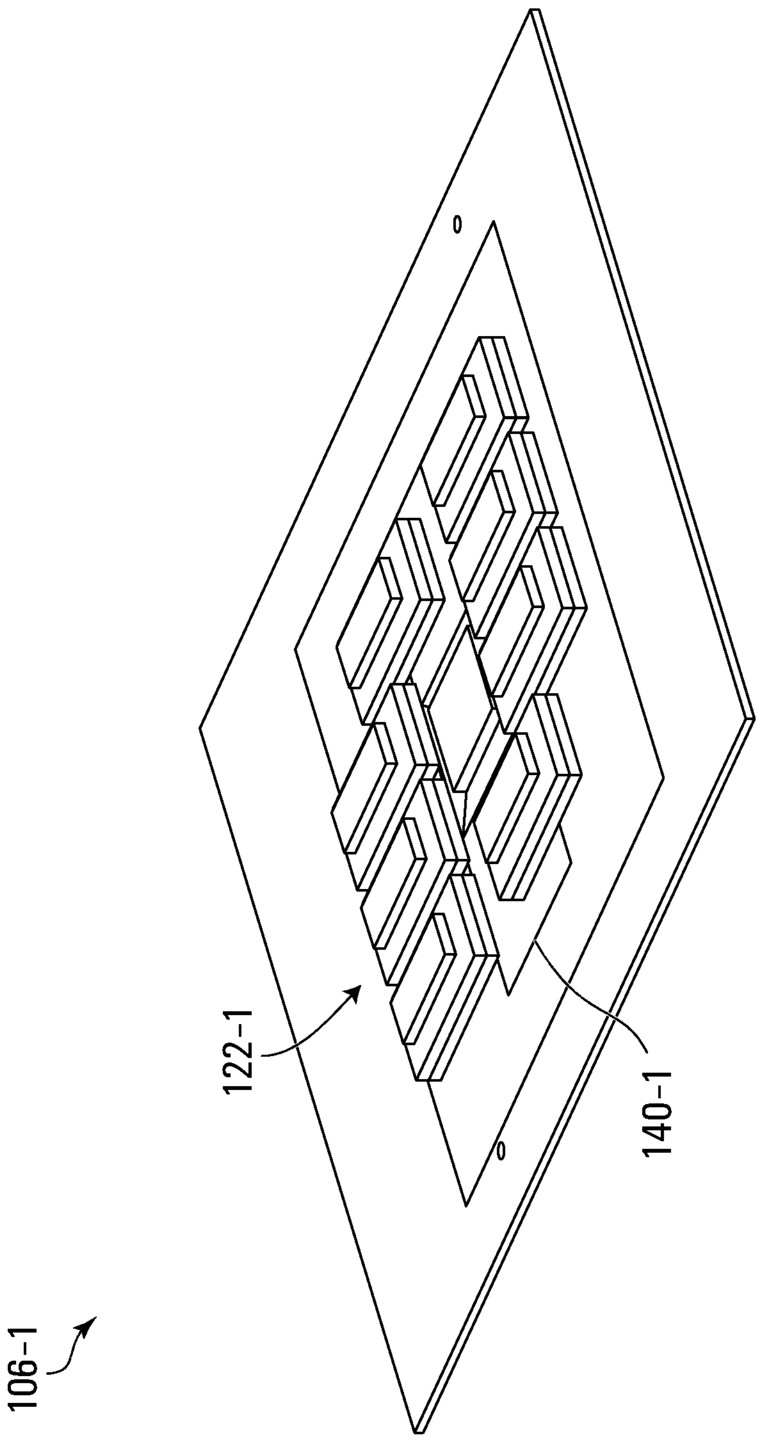
FIG. 13 is a partially transparent perspective view of a portion of the PCB of the transmit configured direct radiating array (DRA) antenna assembly of FIGS. 1-3, further including a radiation shield, according to an embodiment.

Referring now to FIG. 13, shown therein is a perspective view of a portion of PCB 106-1 in isolation, according to an embodiment.

A single RF chain cluster 122-1 (depicted transparently) is visible in FIG. 13.

PCB 106-1 is depicted translucently in FIG. 13, such that radiation shielding copper layer 140-1 is visible through PCB 106-1 (i.e. radiation shielding copper layer 140-1 is configured as an inner layer of multi-layer PCB 106-1).

Figure 14:
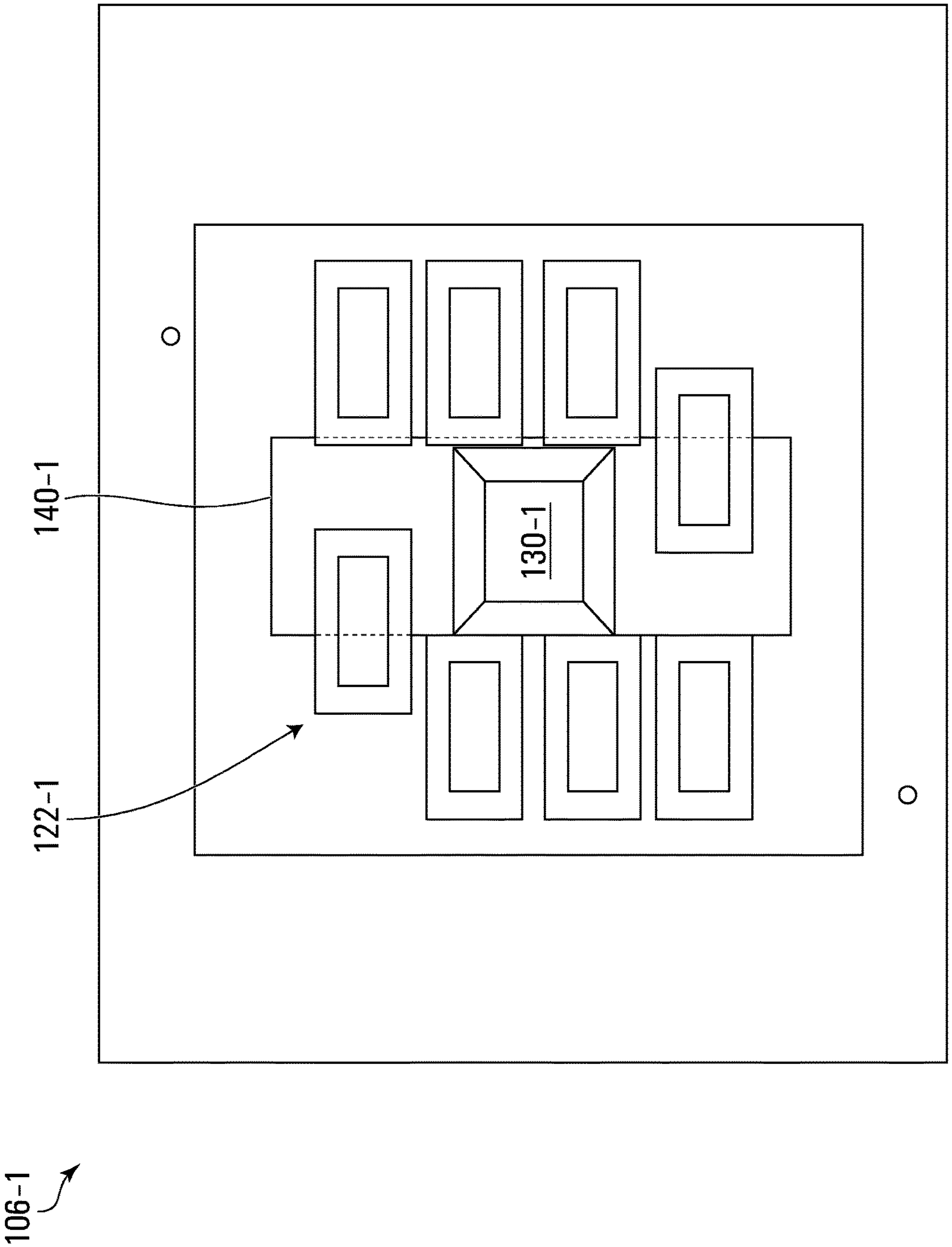
FIG. 14 is a partially transparent plan view of a portion of the PCB of the transmit configured direct radiating array (DRA) antenna assembly of FIGS. 1-3, further including a radiation shield, according to an embodiment.

Referring now to FIG. 14, shown therein is a plan view of the portion of PCB 106-1 of FIG. 15.

PCB 106-1 is depicted translucently, such that radiation shielding copper layer 140-1 is visible through PCB 106-1.

As seen in FIG. 14, radiation shielding copper layer 140-1 is placed below digital beamforming integrated circuit 130-1, as this component comprises a radiation sensitive component in the example embodiment of assembly 100-1.

In other examples, radiation shielding copper layer 140-1 may comprise other shapes, sizes, and positions. In some examples, radiation shielding copper layer 140-1 may comprise a complex compound shape, including several non-intersecting copper regions, or copper islands. In some examples, each non-intersecting copper region may be placed on the same PCB layer or separate PCB layers. In some examples, radiation shielding copper layer 140-1 may be configured and positioned to shield components other than digital beamforming integrated circuit 130-1. In some examples, filter components may be embedded within PCB 106-1 and positioned under radiating elements 112-1. In another example, filter components may be mounted onto front side 108-1 of PCB and positioned under radiating elements 112-1, Such configuration of filter components may contribute to radiation shielding.

As previously described, the use of a copper PCB layer as a radiation shield may result in volume and mass reductions to the assembly 100-1, as discrete radiation shielding components of greater mass and volume may not be required to be attached to the exterior of PCB 106-1 to promote performance of 100-1.

While FIGS. 13 and 14 depict PCB 106-1 of the transmit configured DRA assembly 100-1, similar shielding layers may be present within PCB 106-2, with differing size and positioning, such that radiation sensitive components of RF chains 120-2 on PCB 106-2 are shielded from external electromagnetic radiation that the assembly 100-2 may be exposed to.

While the above description provides examples of one or more apparatus, methods, or systems, it will be appreciated that other apparatus, methods, or systems may be within the scope of the claims as interpreted by one of skill in the art.

The invention claimed is:

1. A direct radiating array ("DRA") antenna, comprising:

a printed circuit board ("PCB") having a first side and a second side opposing the first side;

a thermal interface plate arranged generally parallel to the PCB;

a plurality of radiating elements mounted to the first side of the PCB;

a plurality of radio frequency ("RF") chains mounted to the second side of the PCB and to the thermal interface plate, each respective one of the plurality of RF chains coupled to and located proximate to a respective one of the plurality of radiating elements and thermally coupled to the thermal interface plate; and a plurality of beamforming circuits mounted to the second side of the PCB, wherein each of the RF chains is connected to at least one of the plurality of beamforming circuits;

wherein the PCB includes one or more copper radiation shielding layers embedded in the PCB and configured to shield electrical, electronic, or electromechanical components of the DRA antenna from radiation originating from outer space.

2. The DRA antenna of claim 1, wherein the RF chains are arranged in a plurality of stacks, each respective one of the plurality of stacks mounted to the second side of the PCB and extending generally perpendicular to the second side of the PCB.

3. The DRA antenna of claim 2, wherein each of the plurality of stacks is connected to the thermal interface plate via one or more thermal interface materials.

4. The DRA antenna of claim 1, wherein the radiating elements are patch radiating elements.

5. The DRA antenna of claim 1, wherein the thermal interface plate includes a plurality of fluidic channels.

6. The DRA antenna of claim 1, wherein the thermal interface plate acts as the only thermal spreader and conductive and radiative exchange interface of the DRA antenna with a mobile or stationary structure when mounted on the mobile or stationary structure.

7. The DRA antenna of claim 6, wherein the mobile or stationary structure is a spacecraft.

8. The DRA antenna of claim 6, wherein the mobile or stationary structure is a low earth orbit satellite.

9. The antenna of claim 1, wherein the beamforming circuits are configured to perform digital beamforming.

10. The antenna of claim 1, wherein the beamforming circuits are configured to perform analog beamforming.

11. A direct radiating array ("DRA") antenna, comprising:

a printed circuit board having a first side and a second side opposing the first side;

a plurality of radiating elements mounted to the first side of the PCB; and a plurality of radio frequency ("RF") chains each coupled to a respective one of the plurality of radiating elements, the plurality of RF chains arranged in a plurality of stacks with each respective one of the plurality of stacks mounted to the second side of the PCB and extending generally perpendicular to the second side of the PCB.

12. The antenna of claim 11, wherein the radiating elements comprise patch radiating elements.

13. The antenna of claim 11, further comprising a plurality of beamforming circuits mounted to the second side of the PCB, wherein the beamforming circuits are configured to perform digital beamforming.

14. The antenna of claim 11, further comprising a plurality of beamforming circuits mounted to the second side of the PCB, wherein the beamforming circuits are configured to perform analog beamforming.

15. The DRA antenna of claim 11, wherein the thermal interface plate includes a plurality of fluidic channels.

16. The DRA antenna of claim 11, further comprising a thermal interface plate arranged generally parallel to the PCB, wherein each of the plurality of stacks is thermally coupled to the thermal interface plate.

17. The DRA antenna of claim 16, wherein each of the plurality of stacks is connected to the thermal interface plate via one or more thermal interface materials.

* * * * *